Sept. 24, 1935. E. R. BROKVIST 2,015,358
FOOD REMOVING MEANS FOR COOKING MACHINES
Filed Feb. 28, 1933
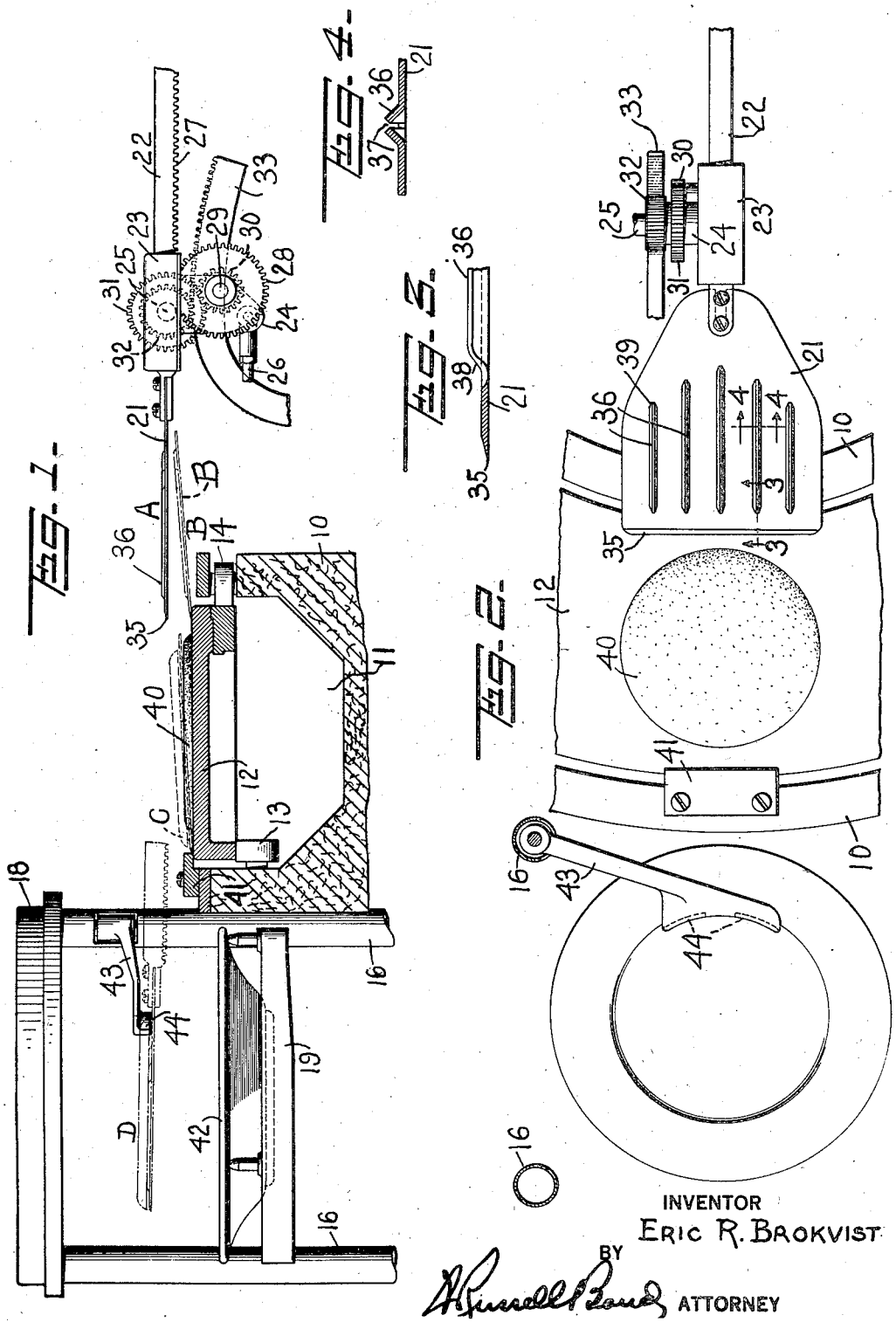
INVENTOR
Eric R. Brokvist
BY
ATTORNEY Patented Sept. 24, 1935

2,015,358

UNITED STATES PATENT OFFICE 2,015,358

FOOD REMOVING MEANS FOR COOKING MACHINES

Eric R. Brokvist, Brooklyn, N. Y., assignor to Harry Russell Brand, New York, N. Y.

Application February 28, 1933, Serial No. 658,954

6 Claims. (Cl. 107—7)

The present invention relates to automatic machines for cooking food on flat cooking surfaces and has for an object to provide improved means for picking up the food from said surfaces.

While my invention may be employed on a variety of cooking machines it is particularly adapted for use in machines for cooking cakes, biscuits, or other foods upon a griddle.

It is a further object of the invention to provide a peel formed with means which will not only facilitate picking up the food from a griddle but will also facilitate the removal of the food from the peel.

In a patent issued February 21, 1933, and bearing Patent No. 1,897,999, is shown a peel adapted to pick up a griddle cake, turn it over and redeposit it upon the griddle, said peel being particularly designed to prevent the cake from slipping off while the peel is being turned. It is a specific object of the present invention to provide a peel which will pick up the cake without turning it over, advance it clear of the griddle and into engagement with a stripper, and then withdraw the peel while in contact with the stripper so that the cake will be stripped off the peel.

I have found that with peels of the type heretofore used there is a tendency for the cake to crumple as the peel is slid thereunder and also that there is a tendency for the cake to crumple as it is stripped off the peel. This I find is due to the fact that the ordinary peel offers too much surface friction which tends to adhere to or drag the cake. It is an object of the present invention to overcome this defect by forming the peel with ribs which will raise the cake off the main body of the peel.

It is a further object of the invention to provide a peel with slotted ribs which will still further reduce friction between the peel and the cake and will admit air freely to the underside of the cake so that the cake will show no tendency to adhere to the peel by reason of any suction effect.

It is a further object of the invention to provide a peel with a sharp knife edge which will facilitate the introduction of the peel between the cake and the griddle and to form on the body of the peel a plurality of ribs running in the direction in which the peel is to be introduced under the cake, such ribs rising gradually from the face of the peel so as to facilitate in the mounting of the cake upon the ribs as the peel is introduced between a cake and the griddle.

Other objects and advantages of my invention will appear in the following description of a preferred embodiment and thereafter the novelty and scope of the invention will be pointed out in the claims.

In the accompanying drawing;

Figure 1 is a fragmental view in side elevation and partly in section of an automatic cake baking machine embodying my invention;

Fig. 2 is a plan view of the same with a portion thereof broken away;

Fig. 3 is a view in longitudinal section of a portion of my improved peel, the section being taken on the line 3—3 of Fig. 2; and Fig. 4 is a view in transverse section of a portion of the peel, the section being taken on the line 4—4 of Fig. 2.

A portion of the frame of the machine embodying my invention is shown at 10. This frame portion is formed with an annular heating chamber 11 over which an annular griddle 12 is mounted to rotate, said griddle being supported and guided by rollers 13 and 14. The machine includes means for rotating the griddle, but such means are not shown as they form no part of the present invention. At the outer side of the griddle, that is the left-hand side as shown in Figs. 1 and 2, there is a plate magazine comprising posts 16 supporting a head 18. An elevator is shown fragmentally at 19, this elevator being adapted to pick dishes or plates one at a time out of the magazine, bring them into cake receiving position, as shown in Fig. 1, and after one or more cakes have been deposited transferring the loaded plate to a delivery point. All of this mechanism, however, has nothing to do with the present invention and needs no further description here.

My improved peel comprises a flexible metal blade or plate 21 suitably fixed to a shank or bar 22 which slides in a sleeve 23. The latter is secured to the upper end of a vertical plate 24 which is journaled on a fixed stud 25. A link 26 is connected at one end to the plate 24 near the lower end thereof and the other end of the link is connected to suitable mechanism, not shown, which operates to tilt the sleeve 23 on its stud 25, as will be explained presently.

The bar 22 is formed with rack teeth 27 on its lower edge which are engaged by a gear 28 projecting through a slot in the under side of the sleeve. This gear is fixed on a shaft 29 journaled in the plate 24. A pinion 30 also fixed on the shaft 29, meshes with a gear 31 journaled on the stud 25. A pinion 32 fixed to turn with the gear 31 meshes with a gear segment 33 which is oscillated at suitable intervals in timed relation to the tilting of the sleeve 23, by mechanism not shown.

The blade of the peel 21 is formed at its outer or forward end with a knife edge 35. The body of the blade is formed with raised ribs 36 which extend parallel to the axis of the bar 22. Preferably, these ribs extend rearwardly from a line spaced from and parallel to the knife edge, as clearly shown in Fig. 2 and they also stop short of the rear end of the blade. While these ribs stiffen the blade a certain amount of flexure is provided between the rear ends of the ribs and the point of attachment of the blade to the bar. The ribs are preferably formed by upsetting them from the metal of the blade. The blade is slit and the metal is punched upward, as shown in Fig. 4, so that each rib consists of a pair of inclined flanges forming in cross-section an incomplete inverted V with a slot 37 between the flanges. The projecting edges of the flanges are preferably left sharp so that there will be merely a line contact for the cake at each side of the slot. Each rib is tapered at its forward end as clearly shown in Fig. 3 at 38, so that when the peel is introduced under a cake it will readily climb up the tapered portion 38 and on to the rib. A similar taper is formed at the rear end of each rib as indicated at 39.

The operation of the peel may be followed by referring to Fig. 1. Normally the peel occupies the position A shown by full lines in said figure. The first operation is to tilt the peel to the position shown by broken lines at B. This is effected by operating mechanism which will push the link 26 toward the right, as shown in Fig. 1. The knife edge of the blade is then firmly pressed upon the griddle 12 and due to the slight resiliency of the blade 21 the knife edge closely engages the griddle and adapts itself to any irregularities of the griddle surface. The next operation is to advance the blade to the position indicated in broken lines at C. This is done by swinging the gear segment 33 toward the left, as viewed in Fig. 1. As the blade is advanced the knife edge 35 scrapes along the griddle 21 and peels the cake 40 off the griddle. A stop 41 is provided on the frame 10, overlapping the outer edge of the griddle opposite the line of movement of the peel, so that should the cake tend to slide on the griddle it would be checked by the stop 41. As the cake is peeled off the griddle it rides up the inclines 38 and on to the ribs 36 so that it is lifted clear of the face of the peel and engages with the peel only along the upper edges of the ribs. These sharp edges serve also to guide the cake and check any tendency for the cake to slue off laterally. After the peel has been advanced to the position shown at C the link 26 is retracted to bring the peel to substantially horizontal position clear of the stop 41 and then it is advanced over a plate 42 supported on the elevator 19.

Mounted on one of the posts 16 of the plate magazine is an arm 43 which projects over the plate 42 and carries a pair of depending arcuate flanges 44. These flanges are in such position that when the peel is advanced to its extreme outward position the flanges will lie back of the cake 40 carried by the peel. The peel having reached its outermost position is slightly tilted upward by a further retraction of the link 26 until it occupies the position shown at D in Fig. 1.

As the peel is thus tilted upward the flanges 44 contact with the blade 21 back of the cake 40. The next operation is to withdraw the peel which movement is effected by a return stroke of the gear segment 33. As the peel is withdrawn the flanges 44 ride up the inclines 39 and scrape along the upper edges of the ribs, stripping the cake 40 off the peel so that it will drop upon the plate 42. Owing to the flexibility of the blade a firm resilient pressure may be exerted by the blade upon the stripper flanges 44. After the blade has cleared the stripper the link 26 is moved back to the position shown in Fig. 1, so that when the peel is completely returned it will occupy its normal full line position A.

I have found that with this construction of blade there is no tendency for the cake to crumple, either when the peel is being introduced between the cake and the griddle or when the stripper flanges 44 are sliding the cake off the blade.

While I have described a preferred embodiment of my invention it will be understood that this is to be taken as illustrative and not limitative and I reserve the right to make various changes in form, construction and arrangement of parts, that fall within the spirit and scope of the following claims.

I claim:

1. A peel comprising a flexible metallic plate, and ribs on the upper face of the plate and extending in a front to rear direction, each rib being formed with a slot extending longitudinally thereof.

2. A peel comprising a flexible metallic plate having a sharp front edge, and ribs on the upper face of the plate, each rib being longitudinally slotted, said ribs being disposed in a direction normal to said front edge.

3. A peel comprising a blade formed of flexible sheet metal, and having a sharp front edge and a set of slotted ribs struck up from the metal, the forward ends of the ribs being spaced from said edge.

4. A peel comprising a blade formed of flexible sheet metal and having a sharp front edge, and a set of slotted ribs struck up from the metal, the forward ends of the ribs being spaced from said edge, each rib being tapered at its forward end to provide a gradual rise from the face of the blade.

5. A peel for removing food from a cooking surface, said device comprising a blade formed of flexible sheet metal and having a sharp front edge, a shank attached to the blade at the rear end thereof, and a plurality of slotted ribs struck up from the metal and extending in front to rear direction, the opposite ends of the ribs being spaced from the front and rear edges of the blade respectively and rising gradually from the surface of the blade.

6. In a machine of the character described, a griddle adapted to bake a cake, a peel, and means for causing relative movement of the peel and griddle to peel the cake off the griddle, the peel being formed with ribs on its upper face extending in the direction of such relative movement, the forward end of each rib rising gradually from the face of the peel, each rib being formed with a slot extending longitudinally thereof.

ERIC R. BROKVIST.